(12) United States Patent
Matsuo et al.

(10) Patent No.: US 8,411,357 B2
(45) Date of Patent: Apr. 2, 2013

(54) MOTOR-OPERATED MICROSCOPE SYSTEM AND SOFTWARE FOR CONTROLLING MOTOR-OPERATED MICROSCOPES

(75) Inventors: Yuichiro Matsuo, Hachioji (JP); Kosuke Takagi, Kawagoe (JP)

(73) Assignee: Olympus Corporation, Tokyo (JP)

(*) Notice: Subject to any disclaimer, the term of this patent is extended or adjusted under 35 U.S.C. 154(b) by 1199 days.

(21) Appl. No.: 12/214,497

(22) Filed: Jun. 18, 2008

(65) Prior Publication Data

US 2009/0015911 A1   Jan. 15, 2009

(30) Foreign Application Priority Data

Jun. 22, 2007   (JP) ................................ 2007-165553

(51) Int. Cl.
   G02B 21/00   (2006.01)
(52) U.S. Cl. ...................................... 359/368; 359/385
(58) Field of Classification Search ........... 359/368–390
   See application file for complete search history.

(56) References Cited

U.S. PATENT DOCUMENTS

| | | | | |
|---|---|---|---|---|
| 6,088,031 | A * | 7/2000 | Lee et al. | 715/862 |
| 7,577,484 | B2 * | 8/2009 | Fiedler et al. | 700/56 |
| 2002/0032696 | A1 * | 3/2002 | Takiguchi et al. | 707/500.1 |
| 2004/0190129 | A1 * | 9/2004 | Peter et al. | 359/368 |
| 2009/0015911 | A1 * | 1/2009 | Matsuo et al. | 359/369 |

FOREIGN PATENT DOCUMENTS

| | | |
|---|---|---|
| JP | 2004-309768 | 11/2004 |
| JP | 2005-128493 | 5/2005 |
| JP | 2005-331888 | 12/2005 |
| JP | 2006-011415 | 1/2006 |
| JP | 2006-194977 | 7/2006 |
| JP | 2006-220904 | 8/2006 |
| WO | 2007/058223 | 5/2007 |

OTHER PUBLICATIONS

"Instructions, Scan R, Automated Image Acquisition Software," Manual Version 2.1, Dec. 2008, Olympus Soft Imaging Solutions GmbH, http://www.microscopy.olympus.eu/microscopes/39_manuals.cfm?prodID=P_T00106.

* cited by examiner

Primary Examiner — Thong Nguyen
(74) Attorney, Agent, or Firm — Kenyon & Kenyon LLP

(57) ABSTRACT

A motor-operated microscope system has a motor-operated microscope section including an illumination optical system, an electric stage, an image forming optical system having an objective lens and an image forming lens, and an image pickup device; a housing; a control device having a screen display and an arithmetic processing section; and software displaying an operating condition setting screen of the motor-operated microscope section on the screen display and controlling an operation of the motor-operated microscope section in accordance with a set condition. The operating condition setting screen has, on one screen, a setting section for an exposure condition with the image pickup means; a setting section for a focusing condition with the objective lenses; an objective interchange setting section; a setting section for wavelength and luminance of illumination light; a setting section for an image pickup range; a display section for a picked-up image; and an operation commanding section for the motor-operated microscope section.

6 Claims, 12 Drawing Sheets

US 8,411,357 B2

MOTOR-OPERATED MICROSCOPE SYSTEM AND SOFTWARE FOR CONTROLLING MOTOR-OPERATED MICROSCOPES

This application claims benefits of Japanese Patent Application No. 2007-165553 filed in Japan on Jun. 22, 2007, the contents of which are incorporated herein by reference.

BACKGROUND OF THE INVENTION

1. Field of the Invention

This invention relates to a box-type microscope apparatus, such as an optical microscope apparatus, having a housing for blocking light or protecting a specimen environment, which chiefly uses a microplate, for the purpose of the observation and/or measurement of a living specimen such as a cell.

2. Description of Related Art

Optical microscopes are generally used as means for observing living cells, in vivo, such as medium cell specimens, cultured with culture fluid on petri dishes or microplates. In recent years, the optical microscope has been combined with a high-sensitivity image pickup means, such as a cooled CCD camera, so that feeble fluorescent light is detected from the medium cell labeled by fluorescence and is recorded as image data. The fluorescent light from the medium cell labeled by fluorescence is extremely feeble, and in order to detect this feeble fluorescent light with accuracy, the detection of light other than the fluorescent light from the cell, namely, of disturbance light, must be prevented as far as possible. For this, some optical microscope apparatuses commercially available have structures such that the entire inverted microscope is covered with a housing and thereby external light is not detected at least when an image is acquired. Such a box-type optical microscope apparatus includes an electric stage on which a microplate can be placed and which is controlled by a computer and thereby can be moved in X and Y directions.

In recent motor-operated microscope systems, a system is proposed that a microscope apparatus is loaded with a personal computer (hereinafter referred as to "PC") and thereby Graphical User Interface (hereinafter referred to as "GUI") is used for an operation screen so that electric control can be made through the operation screen of a control program by Dynamic Link Library (hereinafter referred to as "DLL").

The motor-operated microscope system of this type in the box-type optical microscope apparatus is set forth in the printed matter of the operation screen, for example, of (1) Molecular Devices, "MetaMorph", [online search], http://www.nihonmdc.com/pages/UIC/metamorph.html and (2) Olympus Soft Imaging Solutions, "Scan R".

FIGS. 1-3 are explanatory views showing the operation screen of the motor-operated microscope system described in Item (1), in which FIG. 1 shows a state where the control program is started, FIG. 2 shows a state where various window screens are opened, and FIG. 3 shows a state where a journal file production window screen is opened. This motor-operated microscope system has a boot screen 50, a camera control condition setting screen 51, a focus control condition setting screen 52, an objective control condition setting screen 53, an observation well setting screen 54, a microplate scanning condition setting screen 55, and a photographed image displaying screen 56, and is constructed so that a preset task bar shown in FIG. 1 is selected to give a command and thereby the screens 51-56 can be displayed as window screens on the boot screen 50.

The camera control condition setting screen 51 is constructed so that the exposure time of a camera and the sensitivity of binning can be set. The focus control condition setting screen 52 is constructed so that the amount of movement of the electric stage in a Z direction relative to an objective lens can be set. The objective control condition setting screen 53 is designed so that the magnification of the objective lens can be set. The observation well setting screen 54 is designed so that a desired observation well in the microplate can be set. The microplate scanning condition setting screen 55 is such that the amount of movement of the electric stage per step in the X and Y directions and the scanning order of the desired observation well in the microplate can be set. The photographed image displaying screen 56 is such that an image picked up by the camera can be displayed.

Also, in the motor-operated microscope system described in Item (1), screens for setting conditions of the brightness of illumination light and of wavelength used in the observation (for example, of an excitation filter or a barrier filter used in the observation), although not shown in FIG. 2, are additionally provided as window screens. The camera control condition setting screen 51 includes a camera operating button 51a and an image saving button 51b. The motor-operated microscope system is such that when the camera operating button 51a is pushed, image pickup is performed by the camera and when the image saving button 51b is pushed, a photographed imaged is saved in a preset storage medium. The microplate scanning condition setting screen 55 is provided with a stage operating button 55a. The motor-operated microscope system is such that when the stage operating button 55a is pushed, the electric stage is driven.

When the motor-operated microscope system provided with the control program having the operation screens constructed as mentioned above is used to carry out the observation and/or measurement of a specimen, an operator, after starting the control program to display the boot screen 50 of FIG. 1, selects the preset task bar to give a command and thereby opens the window screens 51-55 for setting individual conditions described in FIG. 2 to set a desired condition in accordance with each window screen. After the completion of the setting, the operator pushes the stage operating button 55a provided on the microplate scanning condition setting screen 55. At this time, the electric stage is operated to locate a desired specimen at an observation position. Subsequently, the operator pushes the camera operating button 51a on the camera control condition setting screen 51. At this time, the camera is operated and the image of the specimen is photographed. A picked-up image is displayed on the photographed image displaying screen 56. Next, the operator pushes the image saving button 51b provided on the camera control condition setting screen 51. At this time, the photographed image is recorded in a preset record medium. After that, a series of operations extending from the push of the stage operating button 55a to the push of the image saving button 51b is repeated with respect to all the desired observation wells set on the observation well setting screen 54. Whereby, the image pickup of the specimen in the desired observation well is completed. After this, the observation and/or measurement of the specimen can be carried out by using the picked-up image.

FIGS. 4-9 are explanatory views showing schematically the operation screen of the motor-operated microscope system described in Item (2), in which FIG. 4 shows a state where the control program is started and the preparation of photography is completed (a state where only the boot screen is opened), FIG. 5 shows a state where an auto-focus setting screen is opened, FIG. 6 shows a state where a photographic condition setting screen is opened, FIG. 7 shows a state where a photographic condition confirming screen is opened, FIG. 8 shows a state where a first screen for setting a photographic well is opened, and FIG. 9 shows a state where a second screen for setting the photographic well is opened.

The motor-operated microscope system described in Item (2) has a boot screen 70, an auto-focus setting screen 71, a photographic condition setting screen 72, a photographic condition confirming screen 73, a first screen 74 for setting the photographic well, and a second screen 75 for setting the photographic well and is constructed so that individual setting screens can be switched and displayed over nearly the entire surface of the boot screen 70. The boot screen 70, as illustrated in FIG. 4, has main and sub-screens 70a, 70b, 70c, and 70d for displaying photographed images, an automatic photography handling command button 70e, and a condition setting command button 70f. The automatic photography handling command button 70e includes a start button 70e1, an interruption button 70e2, and a stop button 70e3. The condition setting command button 70f includes an open button 70f1, an edit button 70f2, and a save button 70f3. When the edit button 70f2 is pushed, the auto-focus setting screen 71 is displayed in a state where it is superimposed on almost the entire area of the boot screen 70.

The auto-focus setting screen 71, as shown in FIG. 5, has setting items 71a-71j relative to exposure time, binning, an objective lens, a filter cube (a barrier filter), illuminance, an excitation filter, coarse focus (width and step), and fine focus (width and step); command buttons 71k and 71l for Setting OK and Setting Cancel; and a setting screen displaying button 71z. The setting screen displaying button 71z includes an auto-focus setting screen displaying button 71z1, a photographic condition setting screen displaying button 71z2, a button 71z3 displaying the first screen for setting the photographic well, and a test displaying button 71z4. When the photographic condition setting screen displaying button 71z2 is pushed, the photographic condition setting screen 72 is displayed in a state where it is superimposed on almost the entire area of the boot screen 70. When the button 71z3 displaying the first screen for setting the photographic well is pushed, the first screen 74 for setting the photographic well is displayed in a state where it is superimposed on almost the entire area of the boot screen 70. Further, when the test displaying button 71z4 is pushed, the photographic condition confirming screen 73 is displayed in a state where it is superimposed on almost the entire area of the boot screen 70.

The auto-focus setting screen 71 is such that when either the OK button 71k or the cancel button 71l is pushed, the screen is closed. When the OK button 71k is pushed, data set in the auto-focus setting screen 71 are housed in a photographic data region, not shown.

The photographic condition setting screen 72, as shown in FIG. 6, has setting items 72a-72j relative to a color channel of a fluorescent reagent, an image type, an objective lens, a filter cube (a barrier filter), Z-direction offset, exposure time, binning, an illumination kind (fluorescence or transmission), an excitation filter, and illuminance; command buttons 72k and 72l for Setting OK and Setting Cancel; and a setting screen displaying button 72z. The setting screen displaying button 72z includes an auto-focus setting screen displaying button 72z1, a photographic condition setting screen displaying button 72z2, a button 72z3 displaying the first screen for setting the photographic well, and a test displaying button 72z4. When the auto-focus setting screen displaying button 72z1 is pushed, the auto-focus setting screen 71 is displayed in a state where it is superimposed on almost the entire area of the boot screen 70. When the button 72z3 displaying the first screen for setting the photographic well is pushed, the first screen 74 for setting the photographic well is displayed in a state where it is superimposed on almost the entire area of the boot screen 70. Further, when the test displaying button 72z4 is pushed, the photographic condition confirming screen 73 is displayed in a state where it is superimposed on almost the entire area of the boot screen 70.

The photographic condition setting screen 72 is such that when either the OK button 72k or the cancel button 72l is pushed, the screen is closed. When the OK button 72k is pushed, data set in the photographic condition setting screen 72 are housed in the photographic data region, not shown. The photographic condition confirming screen 73, as illustrated in FIG. 7, has a photographed image displaying screen 73a; setting items 73b and 73c relative to a Z-direction coarse focus and a Z-direction fine focus; a setting item 73d relative to X-Y direction navigation; and command buttons 73e and 73f for Setting OK and Setting Cancel. The photographic condition confirming screen 73 is such that when either the OK button 73e or the cancel button 73f is pushed, the screen is closed. When the OK button 73e is pushed, data set in the photographic condition confirming screen 73 is housed in the photographic data region, not shown.

The first screen 74 for setting the photographic well, as shown in FIG. 8, has a setting item 74a relative to a photographic location (a column of a well to be photographed/a well to be photographed, a row of a well to be photographed/a well to be photographed); a display item 74b relative to the total number of set photographic parts (photographic numbers) per well; a selective item 74c relative to photographic parts (photographic numbers) per well; a display item 74d of the number of wells per plate, to be photographed, set in the second screen 75 for setting the photographic well; command buttons 74e and 74f for Setting OK and Setting Cancel; and a setting screen displaying button 74z.

The setting screen displaying button 74z includes an auto-focus setting screen displaying button 74z1, a photographic condition setting screen displaying button 74z2, a button 74z3 displaying the first screen for setting the photographic well, and a button 74z4 displaying the second screen for setting the photographic well. When the auto-focus setting screen displaying button 74z1 is pushed, the auto-focus setting screen 71 is displayed in a state where it is superimposed on almost the entire area of the boot screen 70. When the photographic condition setting screen displaying button 74z2 is pushed, the photographic condition setting screen 72 is displayed in a state where it is superimposed on almost the entire area of the boot screen 70. When the button 74z4 displaying the second screen for setting the photographic well is pushed, the second screen 75 for setting the photographic well is displayed in a state where it is superimposed on almost the entire area of the boot screen 70.

The first screen 74 for setting the photographic well is such that when either the OK button 74e or the cancel button 74f is pushed, the screen is closed. When the OK button 74e is pushed, data set in the first screen 74 for setting the photographic well are housed in the photographic data region, not shown.

The second screen 75 for setting the photographic well, as shown in FIG. 9, has setting items 75a, 75b, and 75c relative to the name and type of the plate and wells per plate to be photographed; command buttons 75d, 75e, and 75f for data addition, data deletion, and data edit; and command buttons 75g and 75h for Setting OK and Setting Cancel. The second screen 75 for setting the photographic well is such that when either the OK button 75g or the cancel button 75h is pushed, the screen is closed. When the OK button 75g is pushed, data set in the second screen 75 for setting the photographic well are housed in the photographic data region, not shown.

When the motor-operated microscope system provided with the control program having the operation screens constructed as mentioned above is used to make the preparation of photography for carrying out the observation and/or measurement of the specimen, the operator, after starting the control program to display the boot screen 70 of FIG. 4, pushes the edit button 70f2 to display the auto-focus setting screen 71. Subsequently, conditions are set to various setting items. The setting screen displaying button 71z is pushed to display the photographic condition setting screen 72 and the first screen 74 for setting the photographic well, and various condition are set to preset setting items. Further, the test displaying button 71z4 on the auto-focus setting screen 71 and the test displaying button 72z4 on the photographic condition setting screen 72 are pushed to display the photographic condition confirming screen 73, and various conditions are set to preset setting items.

In the first screen 74 for setting the photographic well, the button 74z4 displaying the second screen for setting the photographic well is pushed to display the second screen 75 for setting the photographic well, and various conditions are set to preset setting items. In each setting screen, the setting screen displaying button is pushed and thereby a desired setting screen is displayed and conditions are set. When the setting of conditions is completed in each setting screen, the OK button is pushed. Whereby, data set in each setting screen are housed in the photographic data region, not shown. Each setting screen is closed and a state where only the boot screen 70 is played is brought about.

In this way, the preparation of photography for carrying out the observation and/or measurement of the specimen is completed. Also, when the save button 70f3 is pushed, the data housed in the photographic data region are saved in a preset storage region. After the preparation of photography for carrying out the observation and/or measurement of the specimen is completed, the start button 70e1 is pushed and thereby the microscope apparatus is driven in accordance with a set condition and all desired observation wells set in the second screen 75 for setting the photographic well are automatically photographed. Whereby, the image pickup of the specimen in each of the desired observation wells is completed. After this, the observation and/or measurement of the specimen can be carried out by using a picked-up image.

SUMMARY OF THE INVENTION

The motor-operated microscope system comprises a motor-operated microscope section including an illumination optical system, an electric stage for placing a specimen vessel thereon and moving a desired part in the specimen vessel to an observation position, an image forming optical system having a plurality of interchangeable objective lenses of different magnifications and a single image forming lens, and an image pickup means picking up an image of a specimen formed through the image forming optical system; a housing incorporating the motor-operated microscope section; a control device having a screen display and an arithmetic processing section; and software for controlling motor-operated microscopes, housed in the arithmetic processing section to display an operating condition setting screen for setting an operating condition of the motor-operated microscope section on the screen display and to control an operation of the motor-operated microscope section through the arithmetic processing section in accordance with the operating condition set through the operating condition setting screen. In this case, the operating condition setting screen is constructed to have, on one screen, a photographic condition setting section for setting an exposure condition with the image pickup means; a focus setting section for setting a focusing condition with each of the objective lenses; an objective interchange setting section for changeover to an objective lens of a desired magnification, of the plurality of objective lenses of different magnifications; an illumination condition setting section for setting wavelength used for illumination light and luminance of illumination light; an image pickup range setting section for setting a desired image pickup range with the image pickup means in the specimen vessel; an image displaying section displaying an image picked up by the image pickup means; and an operation commanding section for commanding the operation of the motor-operated microscope section.

In the motor-operated microscope system of the present invention, it is desirable that the software for controlling motor-operated microscopes is designed so that when the operation of the motor-operated microscope section is commanded through the operation commanding section, the motor-operated microscope section is continuously operated until image pickup in all image pickup ranges set through the image pickup range setting section is completed.

In the motor-operated microscope system of the present invention, it is desirable that the software for controlling motor-operated microscopes is designed so that when the operation of the motor-operated microscope section is commanded through the operation commanding section, exposure is controlled through the image pickup means in accordance with setting information of the photographic condition setting section, a relative distance between the objective lens and the electric stage in a Z direction at an observation position is changed in accordance with setting information of the focus setting section, a changeover is made to an objective lens of a preset magnification in accordance with setting information of the objective interchange setting section, wavelength and luminance with which the specimen is irradiated through the illumination optical system are controlled in accordance with setting information of the illumination condition setting section, the electric stage is moved in X and Y directions by a preset amount in accordance with setting information of the photographic range setting section, the image of the specimen at the observation position is picked up through the image pickup means, and the image picked up by the image pickup means is displayed on the image displaying section and is saved in a preset save region.

The software for controlling motor-operated microscopes according to the present invention used to control a motor-operated microscope system comprising a motor-operated microscope section including an illumination optical system, an electric stage for placing a specimen vessel thereon and moving a desired part in the specimen vessel to an observation position, an image forming optical system having a plurality of interchangeable objective lenses of different magnifications and a single image forming lens, and an image pickup means picking up an image of a specimen formed through the image forming optical system; a housing incorporating the motor-operated microscope section; and a control device having a screen display and an arithmetic processing section, the software being housed in the arithmetic processing section to display an operating condition setting screen for setting an operating condition of the motor-operated microscope section on the screen display and to control an operation of the motor-operated microscope section through the arithmetic processing section in accordance with the operating condition set through the operating condition setting screen. In this case, the operating condition setting screen is constructed to have, on one screen, a photographic condition setting section for setting an exposure condition with the image pickup means; a focus setting section for setting a focusing condition with each of the objective lenses; an objective interchange setting section for changeover to an objective lens of a desired magnification, of the plurality of objective lenses of different magnifications; an illumination condition setting section for setting wavelength used for illumination light and luminance of illumination light; an image pickup range setting section for setting a desired image pickup range with the image pickup means in the specimen vessel; an image displaying section displaying an image picked up by the image pickup means; and an operation commanding section for commanding the operation of the motor-operated microscope section.

In the software for controlling motor-operated microscopes of the present invention, it is desirable that when the operation of the motor-operated microscope section is commanded through the operation commanding section, the motor-operated microscope section is continuously operated until image pickup in all image pickup ranges set through the image pickup range setting section is completed.

In the software for controlling motor-operated microscopes of the present invention, it is desirable that when the operation of the motor-operated microscope section is commanded through the operation commanding section, exposure is controlled through the image pickup means in accordance with setting information of the photographic condition setting section, a relative distance between the objective lens and the electric stage in a Z direction at an observation position is changed in accordance with setting information of the focus setting section, a changeover is made to an objective lens of a preset magnification in accordance with setting information of the objective interchange setting section, wavelength and luminance with which the specimen is irradiated through the illumination optical system are controlled in accordance with setting information of the illumination condition setting section, the electric stage is moved in X and Y directions by a preset amount in accordance with setting information of the photographic range setting section, the image of the specimen at the observation position is picked up through the image pickup means, and the image picked up by the image pickup means is displayed on the image displaying section and is saved in a preset save region.

According to the present invention, the motor-operated microscope system and the software for controlling motor-operated microscopes are obtained in which the load of a screen operation imposed on the operator is reduced to a minimum and the operating condition can be set efficiently and rapidly to operate the microscope.

These and other features and advantages of the present invention will become apparent from the following detailed description of the preferred embodiment when taken in conjunction with the accompanying drawings.

DETAILED DESCRIPTION OF THE PREFERRED EMBODIMENT

Before undertaking the description of the embodiment, the function and effect of the present invention will be explained.

In the motor-operated microscope system and the software for controlling motor-operated microscopes in the present invention, the operating condition setting screen is constructed to have, on one screen, a photographic condition setting section for setting an exposure condition with the image pickup means, a focus setting section for setting a focusing condition with the objective lens, an objective interchange setting section for changeover to an objective lens of a desired magnification, of the plurality of objective lenses of different magnifications, an illumination condition setting section for setting wavelength used for illumination light and luminance of illumination light, an image pickup range setting section for setting a desired image pickup range with the image pickup means in the specimen vessel, an image displaying section displaying an image picked up by the image pickup means, and an operation commanding section for commanding the operation of the motor-operated microscope section. In this way, there is no need to perform the opening and closing operation of a plurality of window screens as in the motor-operated microscope system described in Item (1) or (2) and it is avoidable that the condition setting operation and the confirmation of the setting condition become difficult due to the superposition of window screens. As a result, the load of work of the motor-operated microscope imposed on the operator carrying out various examinations for a large number of specimens can be materially reduced and work time can be made considerably efficient and rapid.

Figure 10:
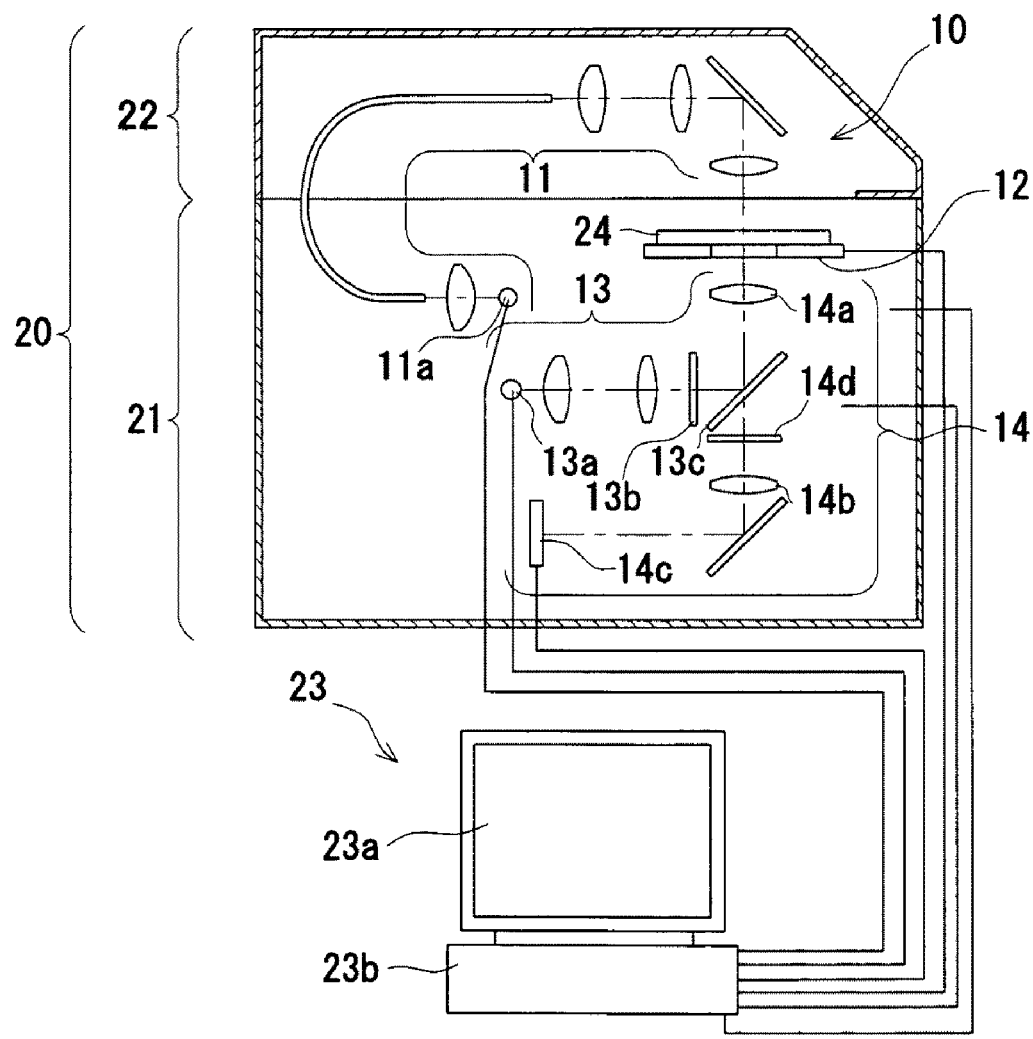
FIG. 10 is an explanatory view showing the entire structure of the motor-operated microscope system according to one embodiment in the present invention.
Figure 11:
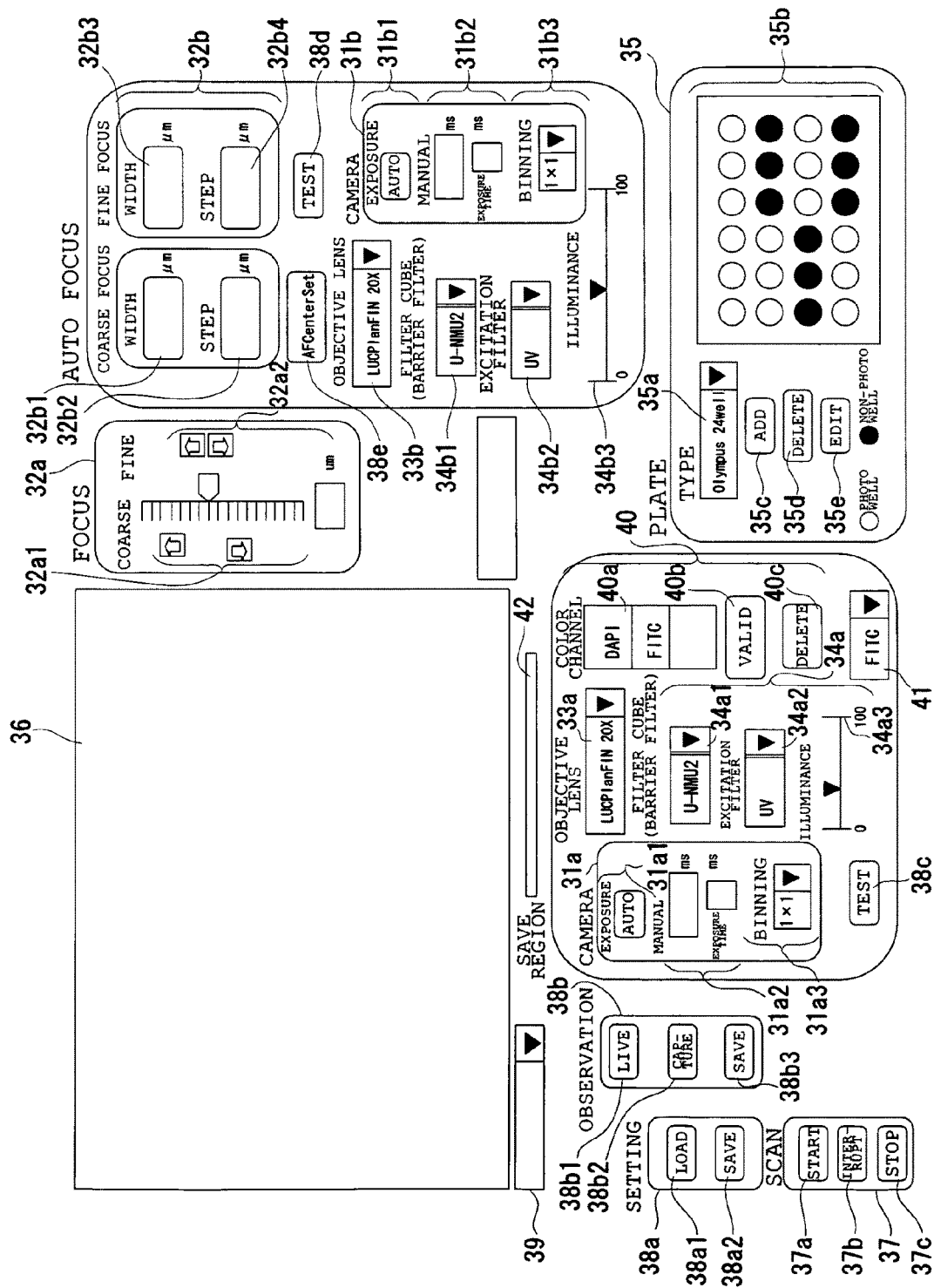
FIG. 11 is an explanatory view showing the layout of the operating condition setting screen in the motor-operated microscope system of FIG. 10.
Figures 12A, 12B:
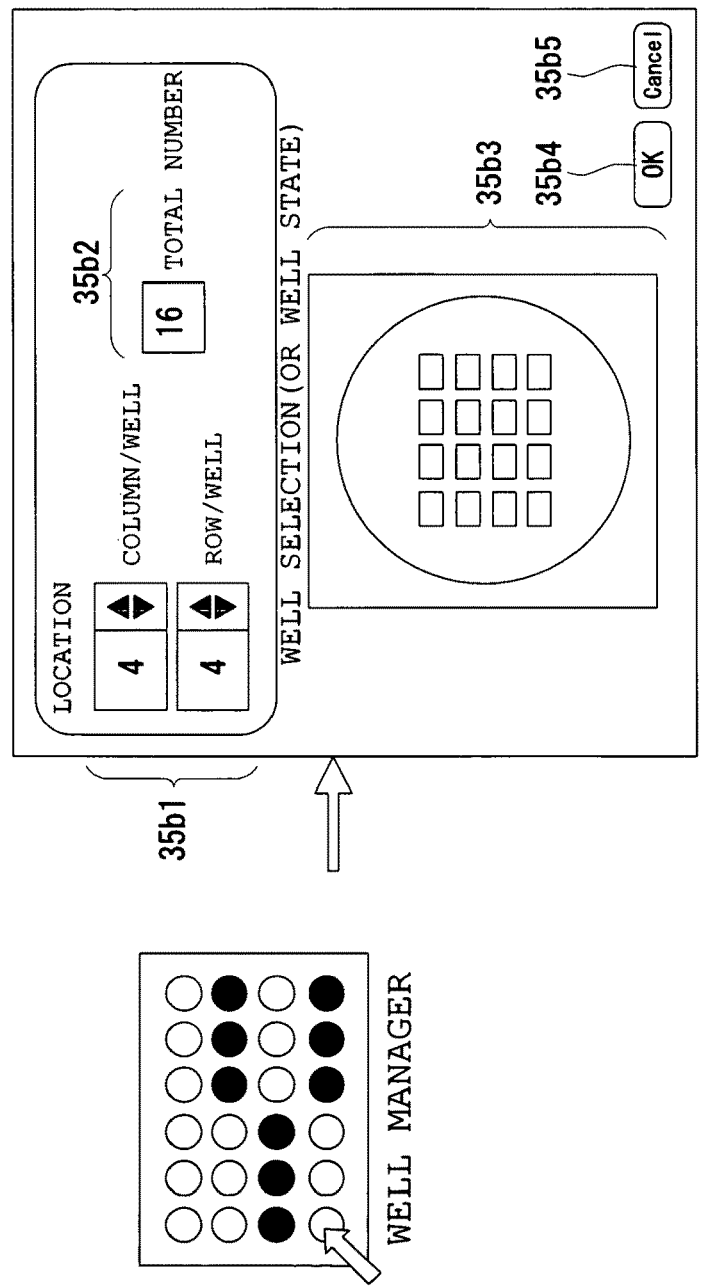
FIGS. 12A and 12B are a side view and a front view, respectively, of the operation screen of FIG. 11.

FIG. 10 is an explanatory view showing the entire structure of the motor-operated microscope system according to one embodiment in the present invention. FIG. 11 is an explanatory view showing the layout of the operating condition setting screen in the motor-operated microscope system of FIG. 10, and FIGS. 12A and 12B are a side view and a front view, respectively, of the operation screen of FIG. 11.

The motor-operated microscope system of the embodiment includes a motor-operated microscope section 10, a housing 20 incorporating the motor-operated microscope section 10, and a control device 23. The motor-operated microscope section has a transmitting illumination optical system 11, an electric stage 12, a reflecting illumination optical system 13, and an image forming optical system 14. The transmitting illumination optical system 11 is placed above the electric stage 12 and is constructed so that the specimen in a specimen vessel 24 placed on the electric stage 12 is irradiated with white light or near-infrared light, for example, of wavelength 680 nm, in a vertical direction from above. The specimen vessel 24 is constructed with a microplate, for instance. In FIG. 10, reference numeral 11a represents a light source such as a xenon lamp. Also, in a specific optical arrangement of the transmitting illumination optical system 11, any arrangement in which the specimen in the specimen vessel 24 can be irradiated with the white light or near-infrared light, for example, of wavelength 680 nm, in a vertical direction from above is applicable.

The electric stage 12 is constructed so that the specimen vessel 24 can be placed thereon. The electric stage 12 is also constructed to be slidable in X and Y directions so that a desired part in the specimen vessel 24 (for example, a desired well in the microplate) can be moved to an observation position by the control of the control device 23 through a driving means (not shown).

The reflecting illumination optical system 13 is placed below the electric stage 12 and is constructed so that the specimen in the specimen vessel 24 placed on the electric stage 12 is irradiated with excitation light in a vertical direction from below. In the figure, reference numeral 13a denotes a light source such as a halogen lamp, 13b denotes an excitation filter, and 13c denotes a dichroic mirror that reflects wavelengths transmitted through the excitation filter 13b and transmits remaining wavelengths. Also, in a specific optical arrangement of the reflecting illumination optical system 13, any arrangement in which the specimen in the specimen vessel 24 is irradiated with the excitation light in a vertical direction from below is applicable.

The image forming optical system 14 has an objective lens 14a and an image forming lens 14b. In the figure, reference numeral 14c denotes a camera (for example, a CCD camera) for picking up the image of the specimen formed through the image forming lens 14b and 14d denotes a barrier filter that transmits a preset wavelength and blocks the transmission of remaining wavelengths. Also, in a specific optical arrangement of the image forming optical system 14, any arrangement in which the objective lens 14a and the image forming lens 14b are provided and the image of the specimen can be formed at a preset image forming position is applicable. The objective lens 14a is such that several kinds of lenses of different magnifications are prepared to be interchangeable through an interchnage means, such as a revolver, omitted from the figure. The excitation filter 13b, the dichroic mirror 13c, and the barrier filer 14d are provided in a cube, not shown. The cube is such that ones combining filters of different transmission wavelength properties are prepared to be replaceable in accordance with an observation application through a replacement means, such as a slider, omitted from the figure.

The housing 20 is constructed with a fixed housing 21 and a moving housing 22. The fixed housing 21 is fixedly placed in a state where optical elements, containing the electric stage 12, arranged below the electric stage 12 are held. The moving housing 22 is constructed to be movable with respect to the fixed housing 21 while holding optical elements (the transmitting illumination optical system 11) arranged above the electric stage 12. The housing 20 is constructed so that the moving housing 22 is moved in a preset direction by a preset amount and thereby the fixed housing 21 is opened and the specimen vessel 24 placed on the electric stage 12 is made replaceable, while the moving housing 22 is made to abut on the fixed housing 21 and thereby the motor-operated microscope section 10 is sealed and light-blocked in cooperation with the fixed housing 21 and the optical axis of the transmitting illumination optical system 11 is practically aligned with that of the image forming optical system 14.

The control device 23 is constructed with a personal computer, for instance, and has a screen displaying device 23a and an arithmetic processing section 23b. The arithmetic processing section 23b is connected to the electric stage 12, the light source 13a, the light source 11a, the CCD camera 14c, the replacement means of the cube, not shown, and the interchange means of the objective lens, not shown. The arithmetic processing section 23b is provided with the software for controlling motor-operated microscopes that displays the operating condition setting screen for setting the operating condition of the motor-operated microscope section 10 on the screen displaying device 23a and controls the operation of the motor-operated microscope section 10 through Dynamic Link Library in accordance with the operating condition set through the operating condition setting screen.

The operating condition setting screen in the software for controlling motor-operated microscopes of the present invention, as shown in FIG. 11, includes, on one screen, photographic condition setting sections 31a and 31b for setting exposure conditions with the image pickup means; focus setting sections 32a and 32b for setting focus conditions with the objective lens 14a; objective interchange setting sections 33a and 33b for changeover to an objective lens of a desired magnification, of a plurality of objective lenses of different magnifications; illumination condition setting sections 34a and 34b for setting wavelength used for illumination light and luminance of the illumination light; an image pickup range setting section 35 for setting a desired image pickup range with the image pickup means in the specimen vessel 24; an image displaying section 36 displaying an image picked up by the image pickup means; and an operation commanding section 37 for commanding the operation of the motor-operated microscope section 10.

The operating condition setting screen of FIG. 11 will be described in more detail.

Figure 5:
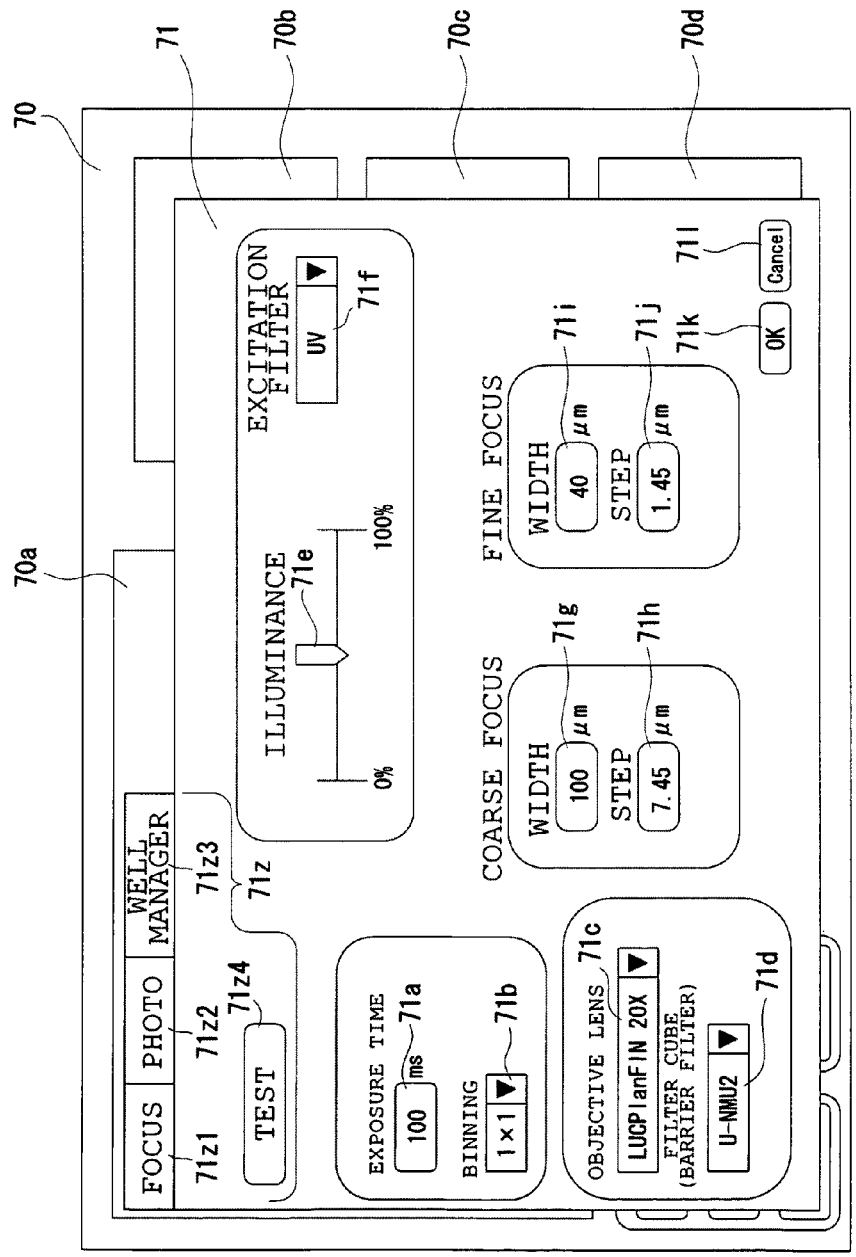
FIG. 5 is an explanatory view showing schematically the operation screen of the motor-operated microscope system described in Item (2), in a state where the auto-focus setting screen is opened.

The photographic condition setting section 31a has setting items 31a1-31a3 relative to selective items of exposure type (automatic·manual), exposure time, and binning. These are the setting items corresponding to, for example, setting items 72f and 72g relative to exposure time and binning on the photographic condition setting screen 72 shown in FIG. 6. The photographic condition setting section 31b has setting items 31b1-31b3 relative to selective items of exposure type (automatic·manual), exposure time, and binning. These are the setting items corresponding to, for example, setting items 71a and 71b relative to exposure time and binning on the auto-focus setting screen 71 shown in FIG. 5.

The focus setting section 32a has setting items 32a1 and 32a2 relative to a Z-direction coarse focus and a Z-direction fine focus. These are the setting items corresponding to, for example, setting items 73b and 73c relative to a coarse focus (width and step) and a fine focus (width and step) on the photographic condition confirming screen 73 shown in FIG.

7. The focus setting section 32*b* has setting items 32*b*1-32*b*4 relative to a coarse focus (width and step) and a fine focus (width and step). These are the setting items corresponding to, for example, setting items 71*g*-71*j* relative to a coarse focus (width and step) and a fine focus (width and step) on the auto-focus setting screen 71 shown in FIG. 5.

The objective interchange setting section 33*a* includes a setting item on the objective lens. This is the setting item corresponding to, for example, a setting item 72*c* relative to the objective lens on the photographic condition setting screen 72 shown in FIG. 6. The objective interchange setting section 33*b* includes a setting item on the objective lens. This is the setting item corresponding to, for example, a setting item 71*c* relative to the objective lens on the auto-focus setting screen 71 shown in FIG. 5.

The illumination condition setting section 34*a* has setting items 34*a*1, 34*a*2, and 34*a*3 relative to a filter cube (a barrier filter), an excitation filter, and illuminance. These are the setting items corresponding to, for example, setting items 72*d*, 72*j*, and 72*i* relative to a filter cube (a barrier filter), an excitation filter, and illuminance on the photographic condition setting screen 72 shown in FIG. 6. The illumination condition setting section 34*b* has setting items 34*b*1, 34*b*2, and 34*b*3 relative to a filter cube (a barrier filter), an excitation filter, and illuminance. These are the setting items corresponding to, for example, setting items 71*d*, 71*f*, and 71*e* relative to a filter cube (a barrier filter), an excitation filter, and illuminance on the auto-focus setting screen 71 shown in FIG. 5.

Figure 9:
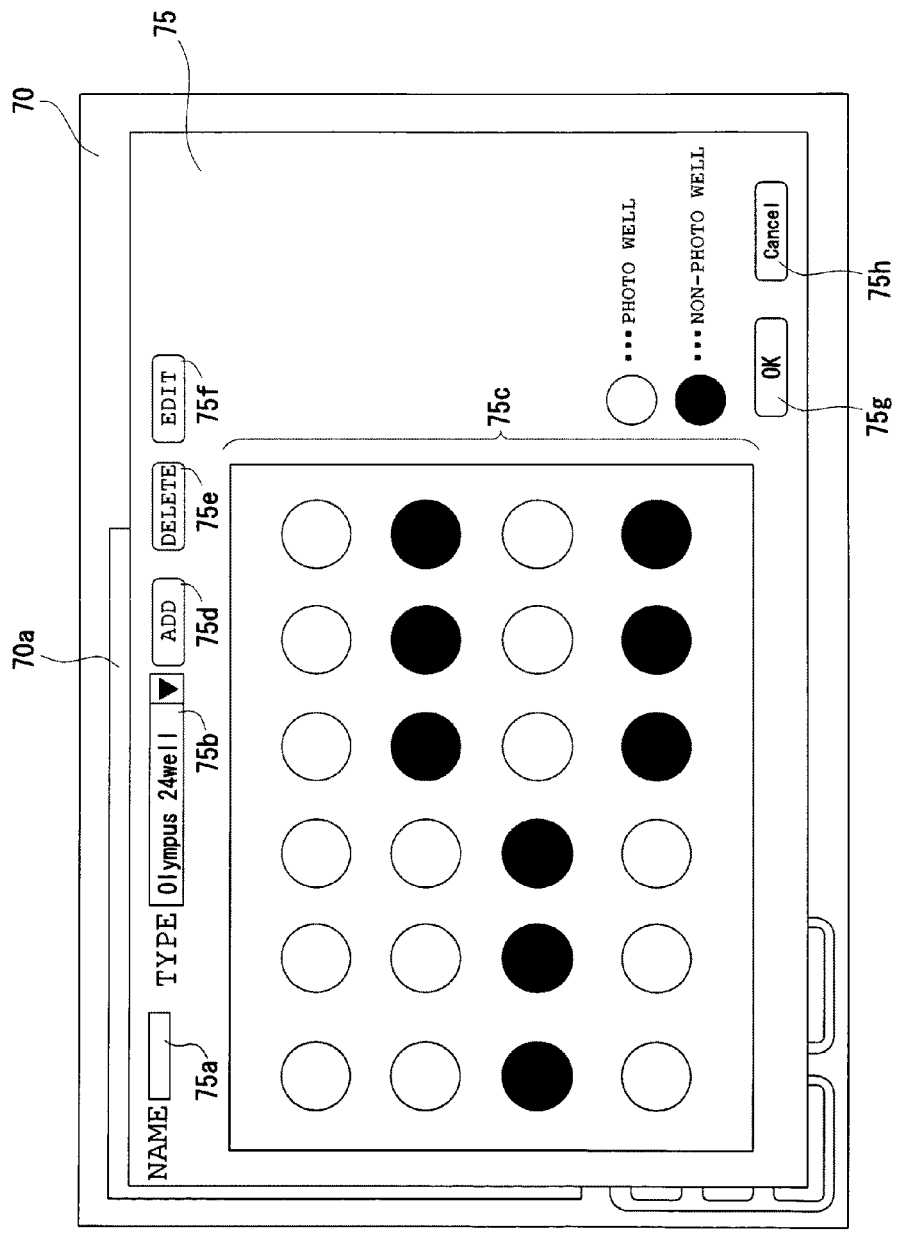
FIG. 9 is an explanatory view showing schematically the operation screen of the motor-operated microscope system described in Item (2), in a state where the second screen for setting the photographic well is opened.

The image pickup range setting section 35 has setting items 35*a* and 35*b* relative to a plate type and wells per plate to be photographed and command buttons 35*c*, 35*d*, and 35*e* for data addition, data deletion, and data edit. These are the setting items and command buttons corresponding to, for example, the setting items 75*b* and 75*c* relative to a plate type and wells per plate to be photographed and the command buttons 75*d*, 75*e*, and 75*f* for data addition, data deletion, and data edit on the second screen 75 for setting the photographic well shown in FIG. 9.

Figure 8:
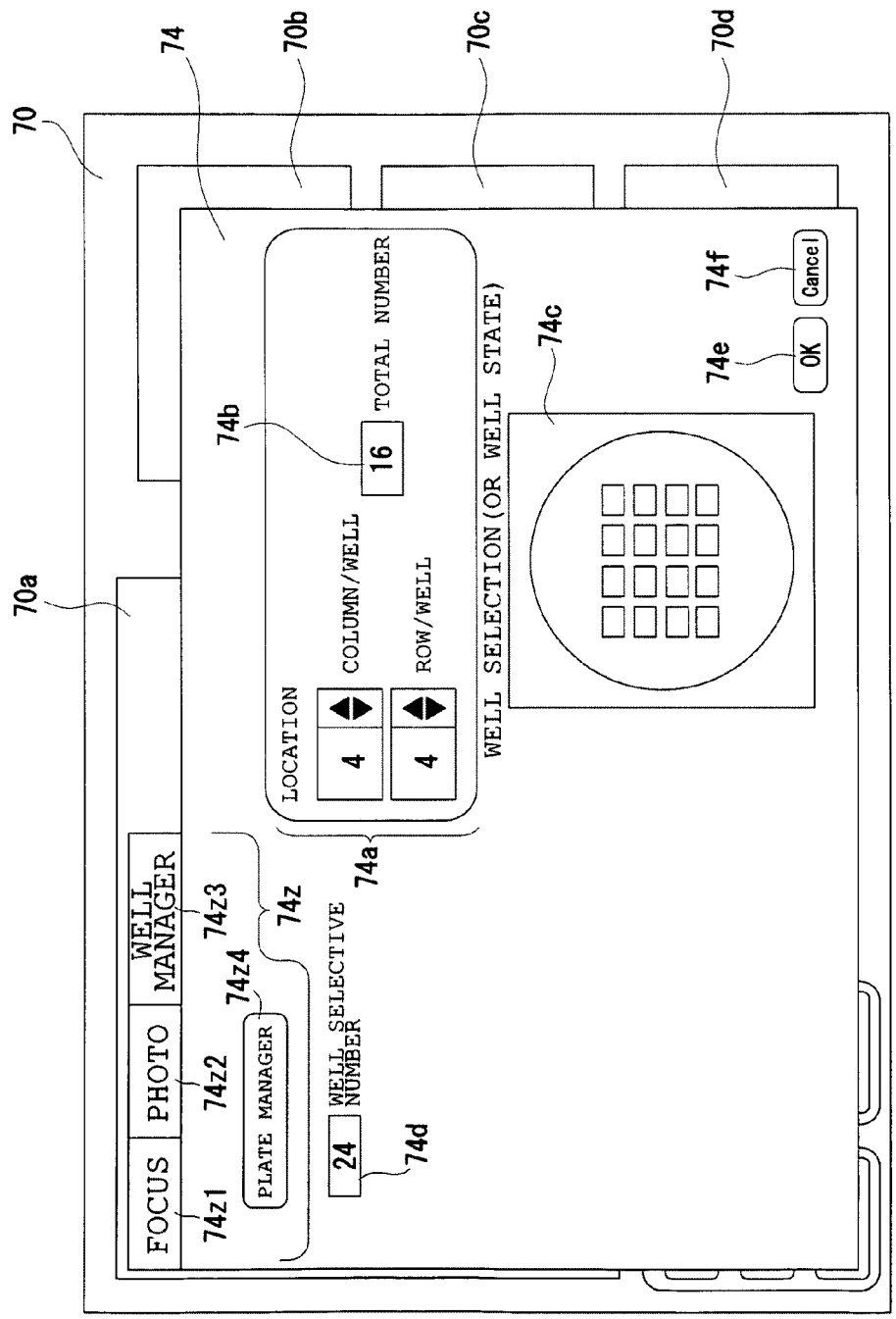
FIG. 8 is an explanatory view showing schematically the operation screen of the motor-operated microscope system described in Item (2), in a state where the first screen for setting the photographic well is opened.

The software for controlling motor-operated microscopes of the embodiment is designed so that, in a setting item 35*b* relative to wells per plate to be photographed, shown in FIG. 12A as an additional function, when a mouse is clicked on a preset well (for example, a well indicated by an arrow in FIG. 12A), of wells designated to be photographed, a window screen for setting the photographic condition per well such as that shown in FIG. 12B can be opened. The window screen of FIG. 12B has a setting item 35*b*1 relative to a photographic location (a column of a well to be photographed/a well to be photographed, a row of a well to be photographed/a well to be photographed), a display item 35*b*2 relative to the total number of set photographic parts per well (photographic numbers), a selective item 35*b*3 of photographic parts (photographic numbers) per well, and command buttons 35*b*4 and 35*b*5 for Setting OK and Setting Cancel. These are the setting item, display item, selective item, and command buttons corresponding to, for example, the setting item 74*a* relative to a photographic location (a column of a well to be photographed/a well to be photographed, a row of a well to be photographed/a well to be photographed); the display item 74*b* relative to the total number of set photographic parts (photographic numbers) per well; the selective item 74*c* of photographic parts (photographic numbers) per well; and command buttons 74*e* and 74*f* for Setting OK and Setting Cancel, on the first screen 74 for setting the photographic well shown in FIG. 8.

Also, the software for controlling motor-operated microscopes in the embodiment is designed so that one well is photographed over the entire range as an initial setting value in the case where the photographic condition per well is not set through the window screen of FIG. 12B. It is also designed so that when the photographic condition per well is set through the window screen of FIG. 12B, its setting value is the setting value of the photographic condition per well until the photographic condition per well is reset through the window screen of FIG. 12B.

Figure 1:
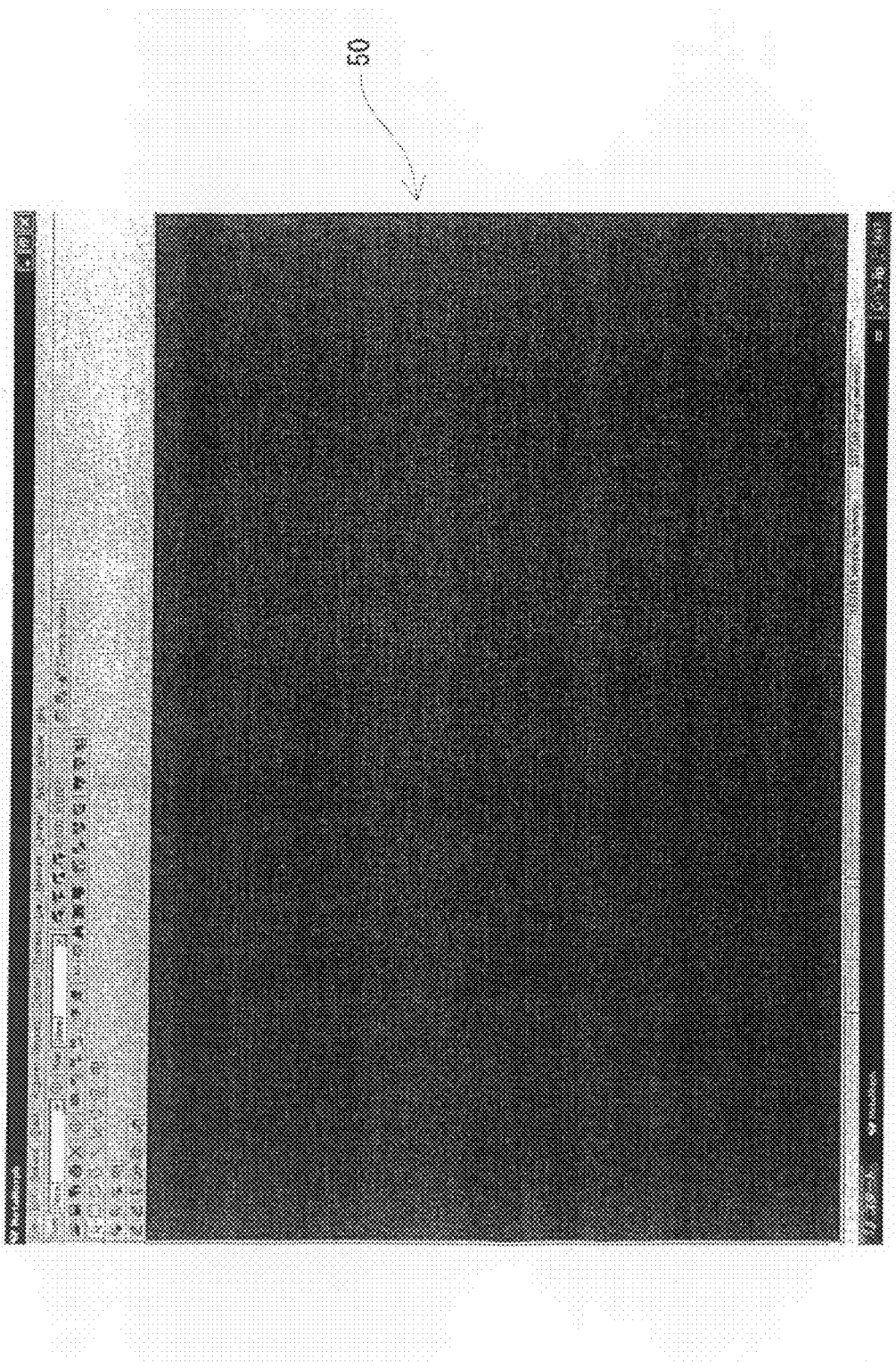
FIG. 1 is an explanatory view showing the operation screen of the motor-operated microscope system described in Item (1), in a state where the control program is started.
Figure 2:
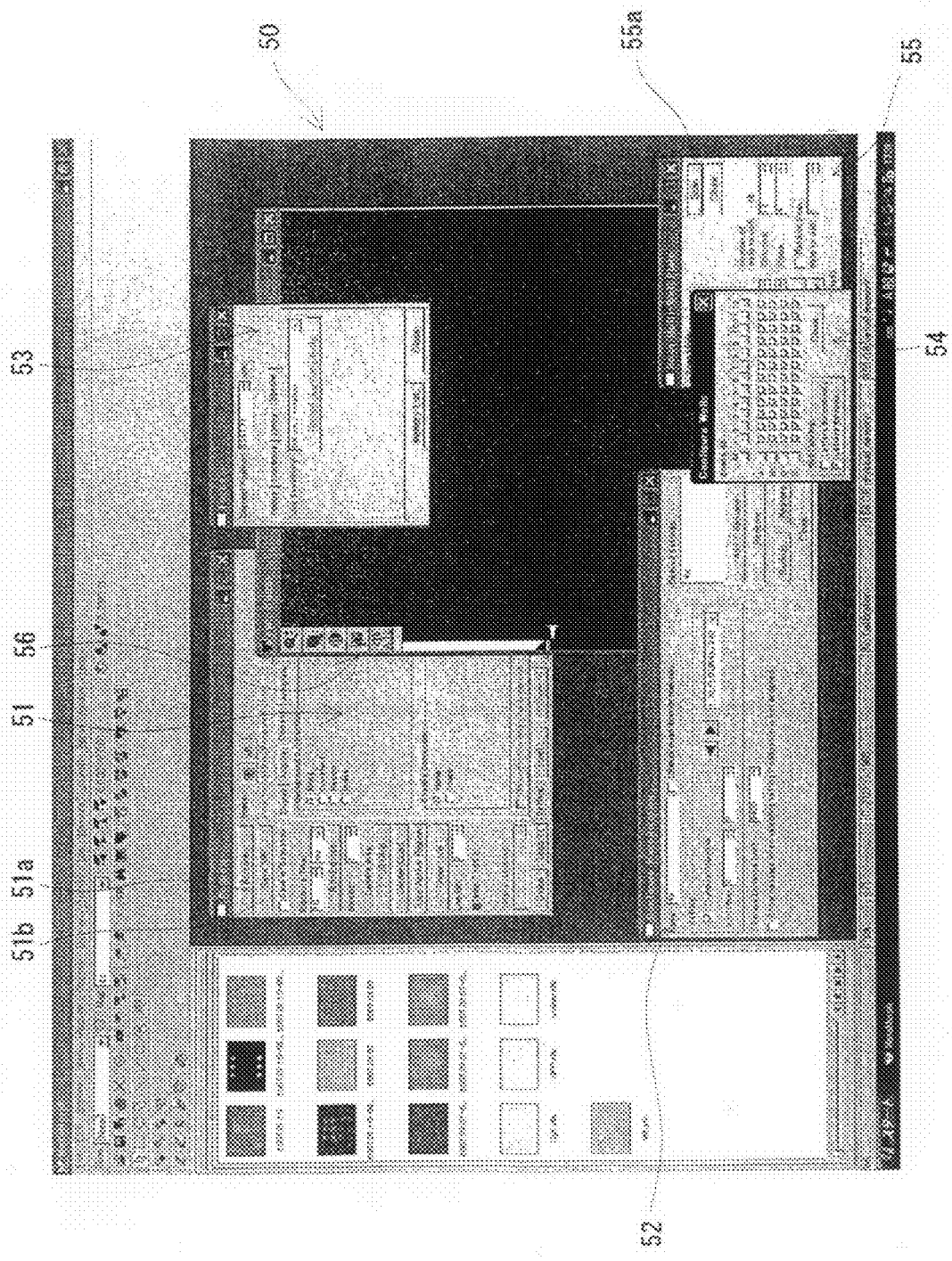
FIG. 2 is an explanatory view showing the operation screen of the motor-operated microscope system described in Item (1), in a state where various window screens are opened.
Figure 3:
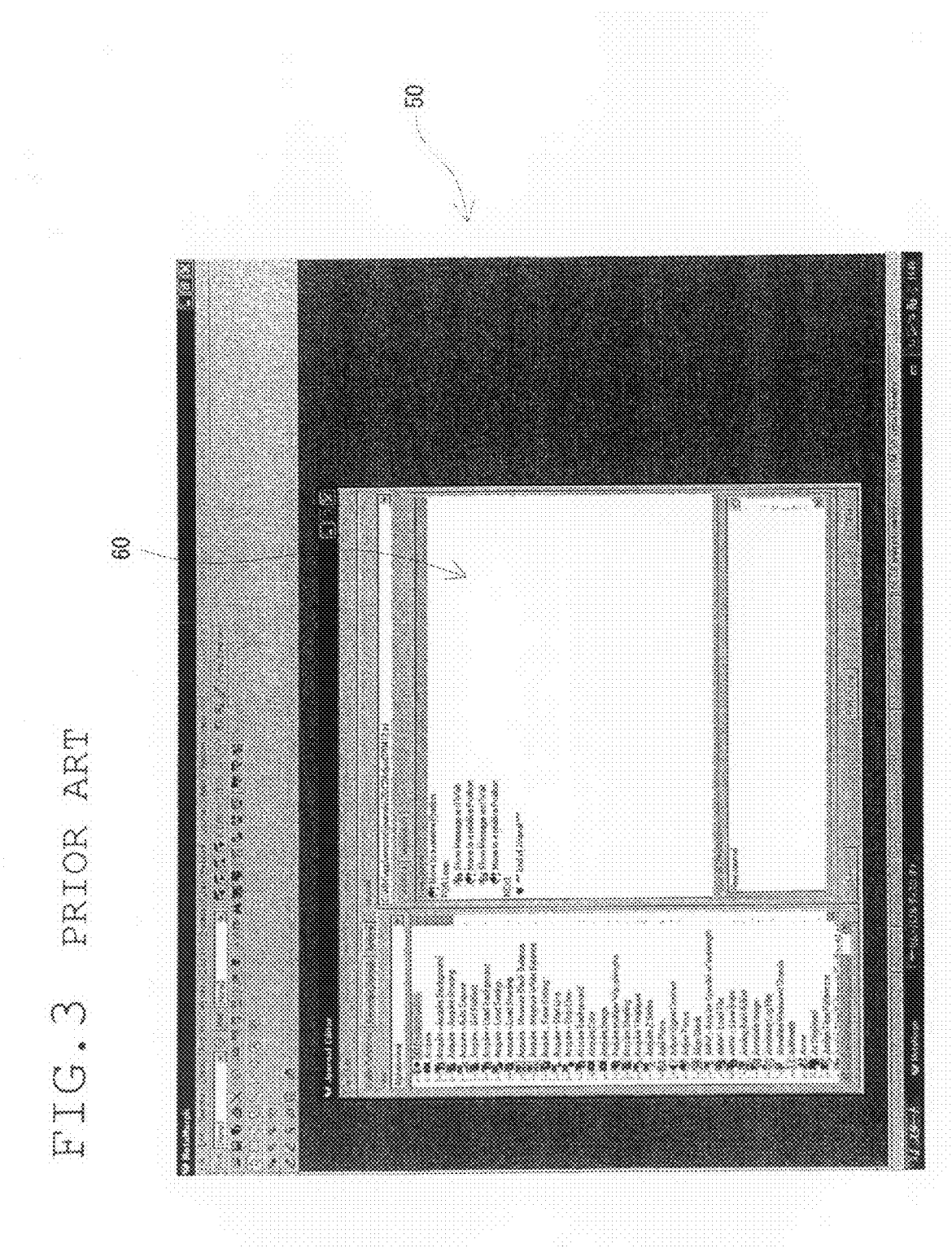
FIG. 3 is an explanatory view showing the operation screen of the motor-operated microscope system described in Item (1), in a state where the journal file production window screen is opened.
Figure 4:
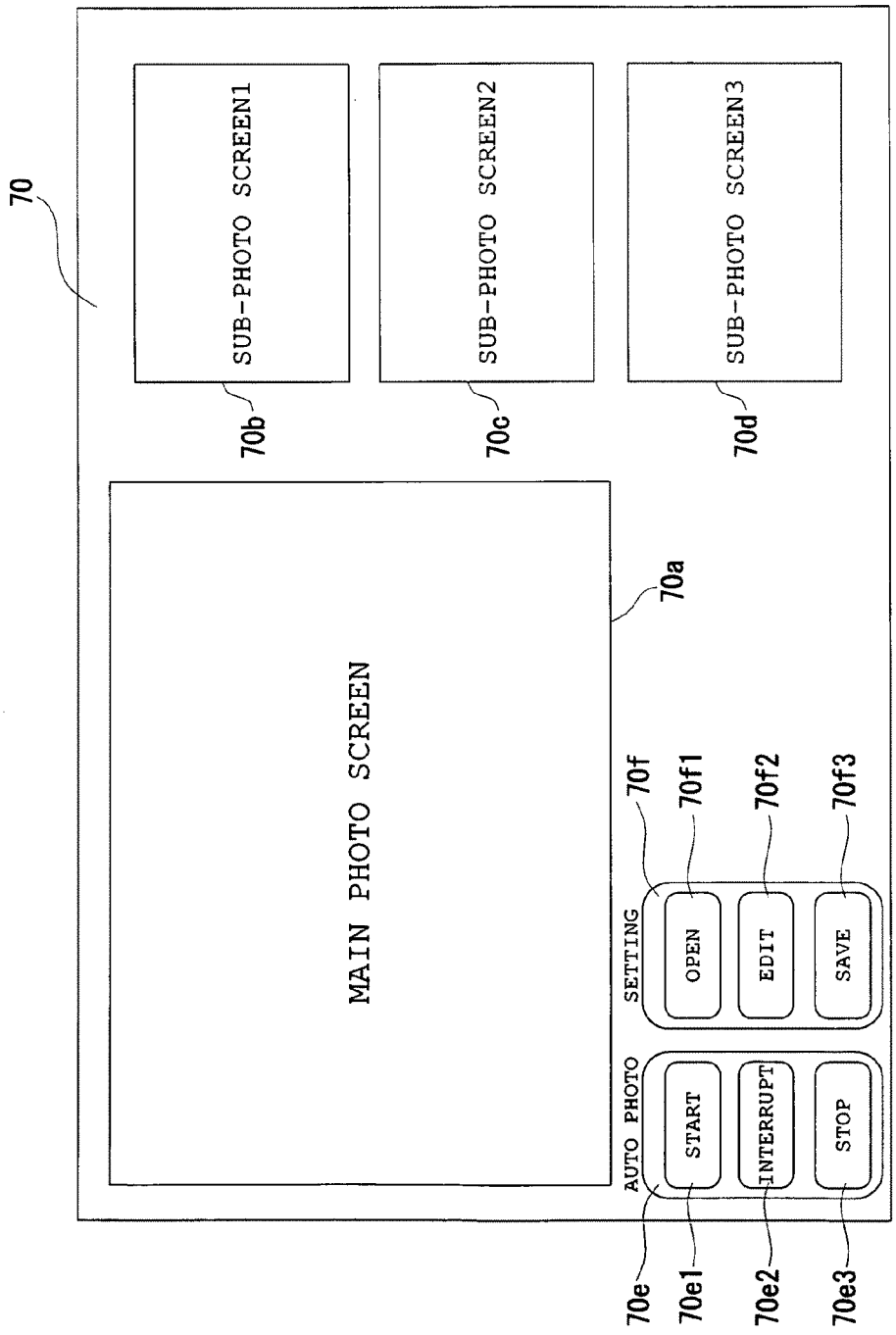
FIG. 4 is an explanatory view showing schematically the operation screen of the motor-operated microscope system described in Item (2), in a state where the control program is started and the preparation of photography is completed (a state where only the boot screen is opened).
Figure 7:
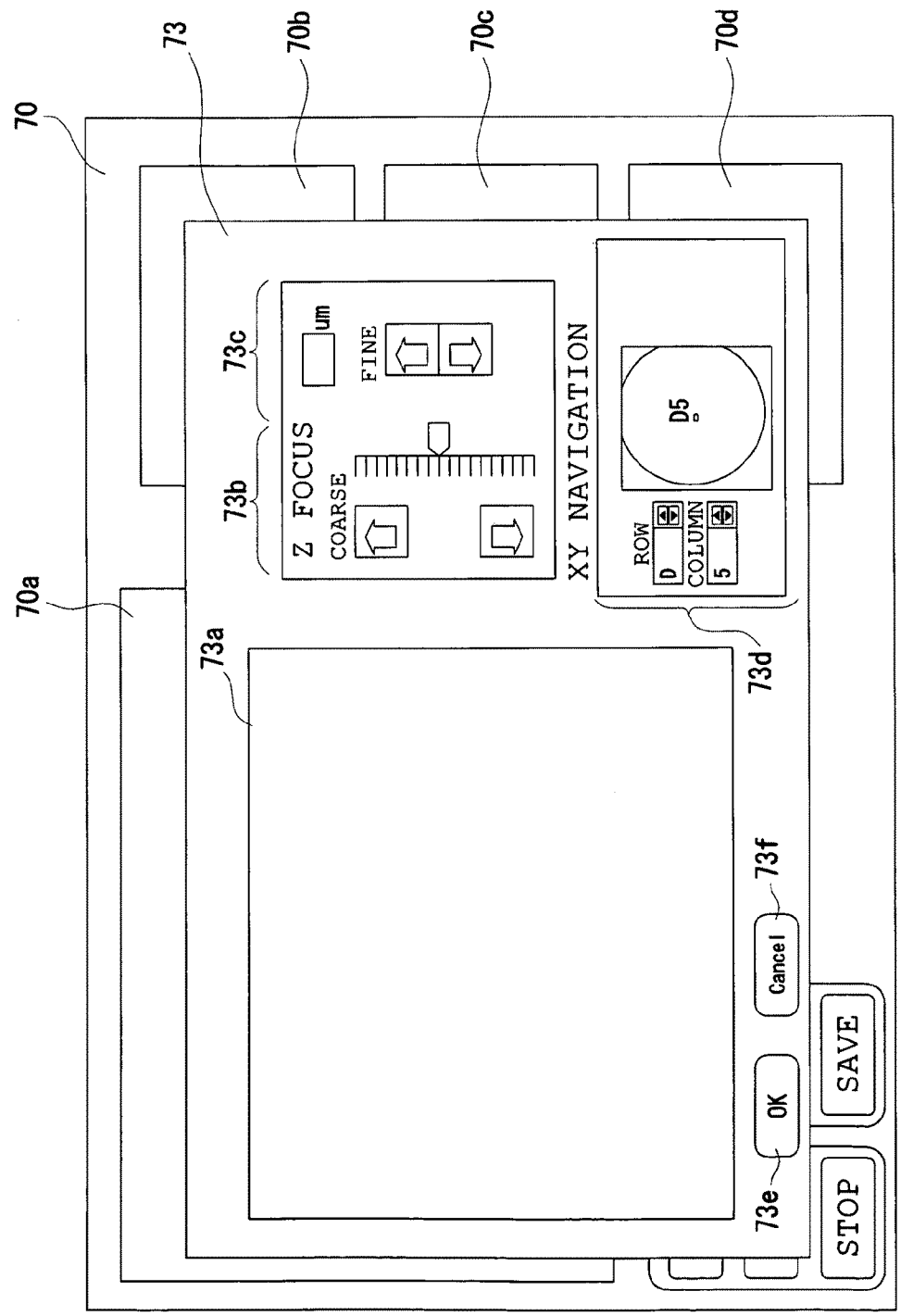
FIG. 7 is an explanatory view showing schematically the operation screen of the motor-operated microscope system described in Item (2), in a state where the photographic condition confirming screen is opened.

The image displaying section 36 includes a photographed image displaying screen. This is the display item corresponding to, for example, the main photographed image displaying screen 70*a* on the boot screen shown in FIG. 4 or the photographed image displaying screen 73*a* on the photographic condition confirming screen 73 shown in FIG. 7. The operation commanding section 37 is constructed with a photography handling command button. The photography handling command button 37 has a start button 37*a*, an interruption button 37*b*, and a stop button 37*c*. These are the command buttons corresponding to, for example, the start button 70*e*1, the interruption button 70*e*2, and the stop button 70*e*3 in the automatic photography handling command button 70*e* of the boot screen 70 shown in FIG. 4.

Further, the operating condition setting screen shown in FIG. 11, in addition to these, has a command button 38*a* for photographic condition setting data input and output, a command button 38*b* for test photographic image processing, a first button 38*c* for test display, a second button 38*d* for test display, a command button 38*e* for storing an auto-focus reference position, a switching list display and designation item 39 for an observation image type according to the reagent, setting items 40 and 41 for the color channel of the fluorescent reagent and the image type, and a designation item 42 for the save location of setting condition data. The command button 38*a* for photographic condition setting data input and output has a load button 38*a*1 and a save button 38*a*2. The load button 38*a*1 is the command button for displaying the operating condition setting data already saved in a preset storage region on the operating condition setting screen. The save button 38*a*2 is the command button corresponding to, for example, the save button 70*f*3 on the boot screen 70 shown in FIG. 4. The command button 38*b* for test photographic image processing has a live image displaying button 38*b*1, a capture button 38*b*2, and a save button 38*b*3.

The live image displaying button 38*b*1 is the command button for displaying a live image according to the setting condition as a photographic condition confirming image on the image displaying section 36 when the first button 38*c* for test display or the second button 38*d* for test display is pushed. The capture button 38*b*2 is the command button for capturing an image at a desired time point of the live image displayed on the image displaying section 36 as a still image in a preset temporary save region and displaying the still image on the image displaying section 36. The save button 38*b*3 is the command button for saving the still image captured through the capture button 38*b*2 in a preset storage region.

Figure 6:
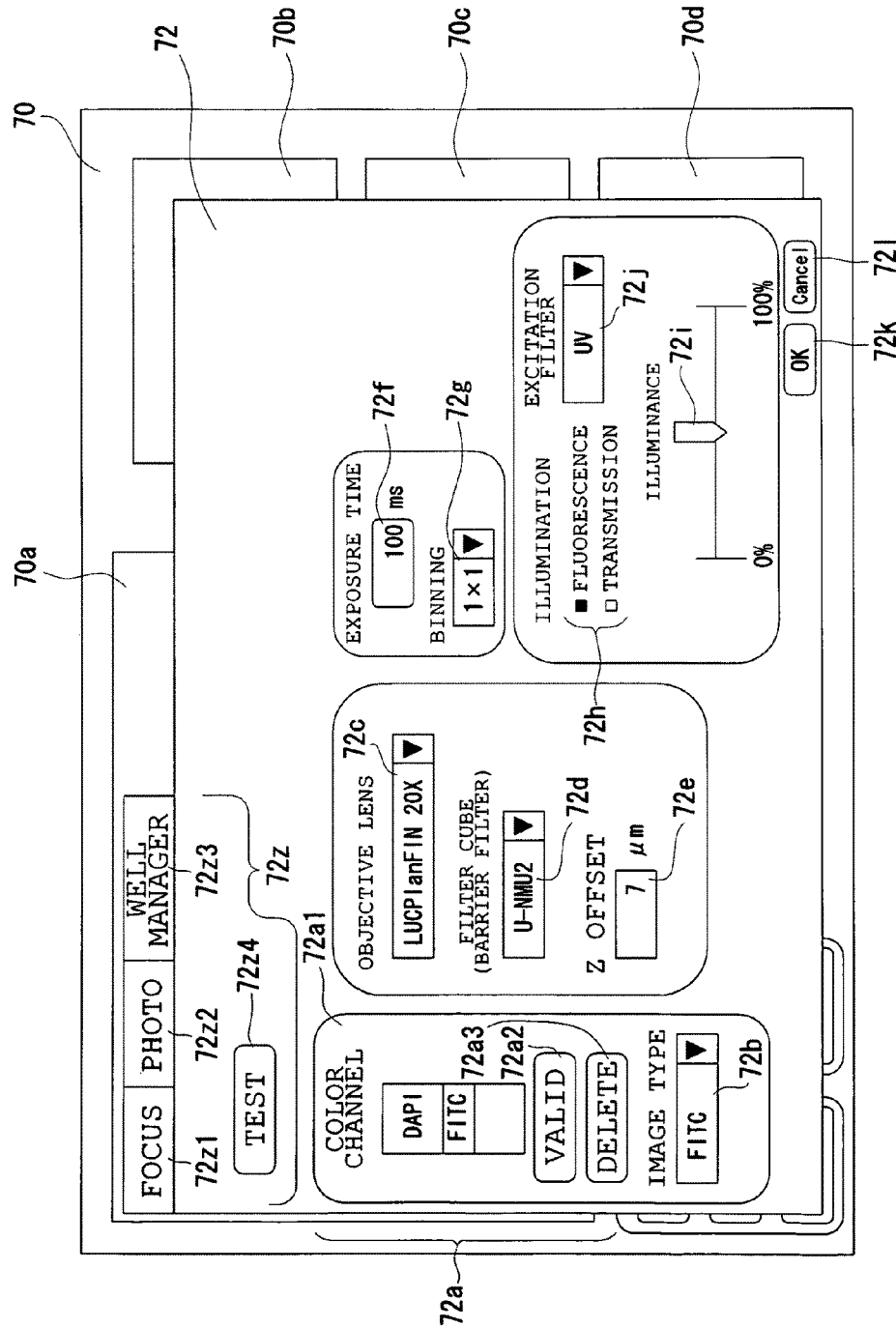
FIG. 6 is an explanatory view showing schematically the operation screen of the motor-operated microscope system described in Item (2), in a state where the photographic condition setting screen is opened.

The first button 38*c* for test display is the command button which corresponds to, for example, the test displaying button 72*z*4 on the photographic condition setting screen 72 shown in FIG. 6 and by which an image based on the setting conditions of the photographic condition setting section 31*a*, the focus setting section 32*a*, the objective interchange setting section 33*a*, the illumination condition setting section 34*a*, and the setting items 40 and 41 relative to the image type is displayed as the photographic condition confirming image on the image displaying section 36. The second button 38*d* for test display is the command button which corresponds to, for example, the test displaying button 71z4 on the auto-focus setting screen 71 shown in FIG. 5 and by which an image based on the setting conditions of the photographic condition setting section 31b, the focus setting section 32b, the objective interchange setting section 33b, and the illumination condition setting section 34b is displayed as the photographic condition confirming image on the image displaying section 36. The command button 38e for storing an auto-focus reference position is the command button by which the position of the objective lens 14 in the Z direction when adjusted to be focused through the focus setting section 32a while displaying the photographic condition confirming live image on the image displaying section 36 is stored in a preset storage region as a reference position in an auto-focus operation.

The setting items 40 and 41 relative to the color channel of the fluorescent reagent and the image type are the ones corresponding to, for example, the setting items 72a and 72b relative to the color channel of the fluorescent reagent and the image type on the photographic condition setting screen 72 shown in FIG. 6. The setting item 40 relative to the color channel of the fluorescent reagent includes a color channel selective section 40a, a command button 40b for making a selective channel effective, and a selective channel deleting button 40c.

In the motor-operated microscope system provided with the software for controlling motor-operated microscopes of the embodiment, the operator inputs desired operating conditions in various setting items whose layout is shown on the boot screen of FIG. 11. When the confirmation of setting contents is desired, the test button 38c (or 38d) is pushed and thereby the setting contents are displayed on the image displaying section 36. Whereby, according to the motor-operated microscope system provided with the software for controlling motor-operated microscopes of the embodiment, without opening window screens for setting various conditions separately opened in Items (1) and (2), the setting of the exposure condition with the image pickup means; the setting of the focusing condition with the objective lens; the setting of changeover to an objective lens of a desired magnification, of a plurality of objective lenses of different magnifications; the setting of wavelength used for illumination light and luminance of illumination light; and even the setting of a desired image pickup range with the image pickup means in the specimen vessel can be performed on a singe screen. Set data are housed in the photographic data region, not shown, and the preparation of photography for carrying out the observation and/or measurement of the specimen is completed.

Here, when the save button 38a2 is pushed, data set in FIG. 11 are saved in a preset storage region. After the preparation of photography for carrying out the observation and/or measurement of the specimen is completed, when the operator pushes the start button 37a, the control device 23 drives the electric stage 12, the light source 13a, the light source 11a, the CCD camera 14c, the cube replacing means, not shown, and the objective interchanging means, not shown, in the motor-operated microscope section 10 on the basis of the data set in FIG. 11. Whereby, the motor-operated microscope is driven and automatic photography relative to all desired observation wells is performed.

More specifically, the exposure is controlled through the CCD camera 14c on the basis of the setting information of the exposure condition with the image pickup means. In accordance with the setting information of the focusing condition with the objective lens, a relative distance in the Z direction between the objective lens 14a and the electric stage 12 is changed. Further, on the basis of the setting information of changeover to an objective lens of a desired magnification, of the plurality of objective lenses of different magnifications, a changeover is made to the objective lens 14 of the desired magnification provided to the revolver, not shown. Still further, on the basis of the setting information of wavelength used for illumination light and luminance of illumination light, amounts of light of the light sources 11a and 13a are adjusted and a changeover is made to a preset cube having the excitation filter 13b, the dichroic mirror 13c, and the barrier filter 14d, provided in the replacement means. In accordance with the setting information of a desired image pickup range with the image pickup means in the specimen vessel, the electric stage 12 is moved in the X and Y directions by a preset amount. Subsequently, the image of the specimen at the observation position is picked up through the CCD camera 14c so that an image picked up by the CCD camera 14c is displayed on the image displaying section 36 and is saved in a preset save region. Such a series of operations is performed with respect to all the desired observation wells, and thereby the image pickup of the specimen in each of the desired observation wells is completed. After this, the observation and/or measurement of the specimen can be carried out by using a picked-up image.

As mentioned above, in order to operate the motor-operated microscope, it becomes necessary to make the setting of the exposure condition with the image pickup means; the setting of the focusing condition with the objective lens; the setting of the changeover to an objective lens of a desired magnification, of the plurality of objective lenses of different magnifications; the setting of wavelength used for illumination light and luminance of illumination light; and the setting of a desired image pickup range with the image pickup means in the specimen vessel. However, in order to avoid wasting the examination result, the setting of the operating condition of the motor-operated microscope requires circumspection. Hence, it becomes necessary for the operator to confirm the setting contents after the setting of the operating condition of the motor-operated microscope. It is sometimes required that the same specimen is observed with several kinds of different wavelengths. Thus, the facilitation of a change in the operating condition of the motor-operated microscope, depending on the circumstances, is necessary for reducing physical and mental loads of the operator who carries out the examinations of a large number of specimens. However, with the window screens for a plurality of condition settings, overlapping in layers as in the motor-operated microscope system described in Item (2), the operation performed until a desired screen is opened imposes a heavy load on the operator performing the operation. Additionally, in the motor-operated microscope system described in Item (1), individual window screens are displayed at different positions in accordance with order that the window screens are opened, and thus the operation is difficult and the individual window screens overlap in a partial region so that it is hard to confirm the setting contents.

In contrast to this, according to the motor-operated microscope system provided with the software controlling motor-operated microscopes of the embodiment, all condition settings necessary for the operation of the motor-operated microscope are made on a single screen. Hence, a complicated operation that a plurality of window screens are opened in accordance with the setting contents becomes unnecessary and it is avoidable that the setting item is hidden below the window screen. In addition, each of the condition setting items is fixedly located at a constant position on the single screen and hence, unlike the motor-operated microscope system described in Item (1), even when the order of the setting of the operating condition is varied, there is no need to look for the position where a desired setting item is displayed. According to the motor-operated microscope system provided with the software for controlling motor-operated microscopes of the embodiment, therefore, maneuverability for the confirmation of the condition setting contents and the change of the setting contents is much better than in the motor-operated microscope system described in Item (1) or (2). Consequently, the load of work of the motor-operated microscope imposed on the operator carrying out various examinations for a large number of specimens can be materially reduced and work time can be made considerably efficient and rapid.

Also, the motor-operated microscope system provided with the software for controlling motor-operated microscopes of the embodiment is such that when the mouse is clicked on the well designated to be photographed in the setting item 35b for wells to be photographed on one plate shown in FIG. 12A as the additional function, the window screen for setting the photographic condition per well as shown in FIG. 12B is opened. However, the screen shown in FIG. 12B is used when the photographic range per well is set in more detail as the additional function, and even though the setting is not made, the entire range of one well is only designated to be photographed. When the setting is once made, there is little need to make again the setting each time an observation technique and the specimen are changed. Hence, even when the function of displaying the window screen of FIG. 12B is added, the maneuverability is not impaired.

Also, although the motor-operated microscope system of the embodiment is constructed so that after one operating condition is set, the motor-operated microscope is operated on the basis of its operating condition, it may be designed so that a plurality of operating conditions are together set and the motor-operated microscope is continuously operated on the basis of each operating condition. For example, when the save button 38a2 is pushed after some operating condition setting is completed, the setting contents are stored in a preset storage region so that another operating condition can be again set. In this case, processing enumerating the commands of a general-purpose program like the journal file production processing in the motor-operated microscope system of Item (1) is automatically produced inside the arithmetic processing section 23b. In this way, when the start button 37a is pushed after a plurality of operating condition settings are completed, the motor-operated microscope is continuously operated on the basis of the operating conditions enumerated in the produced journal file. By doing so, the operation of the screen becomes simpler and a large number of examinations can be carried out more efficiently and rapidly.

As will be evident from the above description, the present invention is useful in the fields of medical treatment, medical science, and biology in which the microplate is used through the motor-operated microscope to observe and/or measure living specimens, such as cells.

What is claimed is:

1. A motor-operated microscope system comprising:
   a motor-operated microscope section including:
      an illumination optical system;
      an electric stage for placing a specimen vessel thereon and moving a desired part in the specimen vessel to an observation position;
      an image forming optical system having a plurality of interchangeable objective lenses of different magnifications and a single image forming lens; and
      image pickup means picking up an image of a specimen formed through the image forming optical system;
   a housing incorporating the motor-operated microscope section;
   a control device having a screen display and an arithmetic processing section; and
   software for controlling motor-operated microscopes, housed in the arithmetic processing section to display an operating condition setting screen for setting an operating condition of the motor-operated microscope section on the screen display and to control an operation of the motor-operated microscope section through the arithmetic processing section in accordance with the operating condition set through the operating condition setting screen,
   wherein the operating condition setting screen is constructed to have:
      a photographic condition setting section for setting an exposure condition with the image pickup means;
      a focus setting section for setting a focusing condition with each of the objective lenses;
      an objective interchange setting section for changeover to an objective lens of a desired magnification, of the plurality of objective lenses of different magnifications;
      an illumination condition setting section for setting wavelength used for illumination light and luminance of illumination light;
      an image pickup range setting section for setting a desired image pickup range with the image pickup means in the specimen vessel;
      an image displaying section displaying an image picked up by the image pickup means; and
      an operation commanding section for commanding the operation of the motor-operated microscope section,
   which are simultaneously arranged in a single window free from overlapping each other.

2. A motor-operated microscope system according to claim 1, wherein the software for controlling motor-operated microscopes is constructed so that when the operation of the motor-operated microscope section is commanded through the operation commanding section, the motor-operated microscope section is continuously operated until image pickup in all image pickup ranges set through the image pickup range setting section is completed.

3. A motor-operated microscope system according to claim 1 or 2, wherein the software for controlling motor-operated microscopes is constructed so that when the operation of the motor-operated microscope section is commanded through the operation commanding section, exposure is controlled through the image pickup means in accordance with setting information of the photographic condition setting section, a relative distance between the objective lens and the electric stage in a Z direction at an observation position is changed in accordance with setting information of the focus setting section, a changeover is made to an objective lens of a preset magnification in accordance with setting information of the objective interchange setting section, wavelength and luminance with which the specimen is irradiated through the illumination optical system are controlled in accordance with setting information of the illumination condition setting section, the electric stage is moved in X and Y directions by a preset amount in accordance with setting information of the photographic range setting section, the image of the specimen at the observation position is picked up through the image pickup means, and the image picked up by the image pickup means is displayed on the image displaying section and is saved in a preset save region.

4. Software for controlling motor-operated microscopes used to control a motor-operated microscope system, the motor-operated microscope system comprising:

a motor-operated microscope section including:
an illumination optical system;
an electric stage for placing a specimen vessel thereon and moving a desired part in the specimen vessel to an observation position;
an image forming optical system having a plurality of interchangeable objective lenses of different magnifications and a single image forming lens; and
image pickup means picking up an image of a specimen formed through the image forming optical system;
a housing incorporating the motor-operated microscope section; and
a control device having a screen display and an arithmetic processing section,
the software being housed in the arithmetic processing section to display an operating condition setting screen for setting an operating condition of the motor-operated microscope section on the screen display and to control an operation of the motor-operated microscope section through the arithmetic processing section in accordance with the operating condition set through the operating condition setting screen,
wherein the operating condition setting screen is constructed to have:
a photographic condition setting section for setting an exposure condition with the image pickup means;
a focus setting section for setting a focusing condition with each of the objective lenses;
an objective interchange setting section for changeover to an objective lens of a desired magnification, of the plurality of objective lenses of different magnifications;
an illumination condition setting section for setting wavelength used for illumination light and luminance of illumination light;
an image pickup range setting section for setting a desired image pickup range with the image pickup means in the specimen vessel;
an image displaying section displaying an image picked up by the image pickup means; and
an operation commanding section for commanding the operation of the motor-operated microscope section,
which are simultaneously arranged in a single window free from overlapping each other.

5. Software for controlling motor-operated microscopes according to claim 4, wherein when the operation of the motor-operated microscope section is commanded through the operation commanding section, the motor-operated microscope section is continuously operated until image pickup in all image pickup ranges set through the image pickup range setting section is completed.

6. Software for controlling motor-operated microscopes according to claim 4 or 5, wherein when the operation of the motor-operated microscope section is commanded through the operation commanding section, exposure is controlled through the image pickup means in accordance with setting information of the photographic condition setting section, a relative distance between the objective lens and the electric stage in a Z direction at an observation position is changed in accordance with setting information of the focus setting section, a changeover is made to an objective lens of a preset magnification in accordance with setting information of the objective interchange setting section, wavelength and luminance with which the specimen is irradiated through the illumination optical system are controlled in accordance with setting information of the illumination condition setting section, the electric stage is moved in X and Y directions by a preset amount in accordance with setting information of the photographic range setting section, the image of the specimen at the observation position is picked up through the image pickup means, and the image picked up by the image pickup means is displayed on the image displaying section and is saved in a preset save region.

* * * * *